(12) United States Patent
Tachibana et al.

(10) Patent No.: US 6,662,455 B2
(45) Date of Patent: Dec. 16, 2003

(54) CUTTING MECHANISM FOR A SABER SAW

(75) Inventors: Toshihiko Tachibana, Hitachinaka (JP); Yoshio Osada, Hitachinaka (JP)

(73) Assignee: Hitachi Koki Co., Ltd. (JP)

( * ) Notice: Subject to any disclaimer, the term of this patent is extended or adjusted under 35 U.S.C. 154(b) by 34 days.

(21) Appl. No.: 10/082,073

(22) Filed: Feb. 26, 2002

(65) Prior Publication Data

US 2002/0138991 A1 Oct. 3, 2002

(30) Foreign Application Priority Data

Mar. 28, 2001 (JP) ........................................ 2001-092911

(51) Int. Cl.[7] ......................... B27B 19/00; B23D 16/12
(52) U.S. Cl. ........................................... 30/393; 30/394
(58) Field of Search ........................ 30/392, 393, 394, 30/272, 273, 376, 377, 374, 375; 83/746, 721, 699, 699.21, 646; 74/50, 60

(56) References Cited

U.S. PATENT DOCUMENTS

| 3,461,732 | A | * | 8/1969  | Gregory ........................ 74/60 |
| 3,945,120 | A | * | 3/1976  | Ritz ............................. 30/393 |
| 4,884,344 | A | * | 12/1989 | Martinez et al. ............... 30/394 |
| 5,009,012 | A | * | 4/1991  | Martinez et al. ............... 30/394 |
| 5,607,023 | A | * | 3/1997  | Palm ........................... 173/178 |
| 5,782,000 | A | * | 7/1998  | Bednar ......................... 30/393 |
| 5,810,367 | A | * | 9/1998  | Holzer et al. ................. 279/102 |
| 6,282,797 | B1 | * | 9/2001 | Osada et al. ................... 30/392 |
| 6,357,125 | B1 | * | 3/2002 | Feldmann et al. .............. 30/392 |

* cited by examiner

*Primary Examiner*—Allan N. Shoap
*Assistant Examiner*—Ghassem Alie
(74) *Attorney, Agent, or Firm*—Parkhurst & Wendel, L.L.P.

(57) ABSTRACT

Two different eccentric shaft portions are formed on a secondary shaft. A contact plate has two different contact portions which are selectively brought into contact with two eccentric shaft portions of the secondary shaft. The contact plate is attached to a guide sleeve. A plunger is slidably coupled in the guide sleeve. A saw blade, attached to a front end of the plunger, causes an orbital motion according to a phase difference between two eccentric shaft portions regardless of attached direction (i.e., normal or upside-down) of the saw blade.

33 Claims, 13 Drawing Sheets

ROTATIONAL
DIRECTION

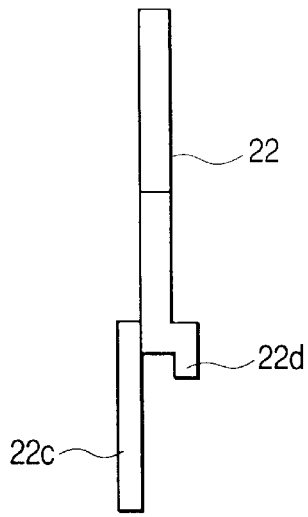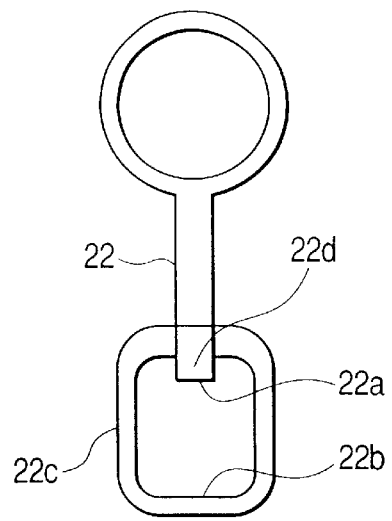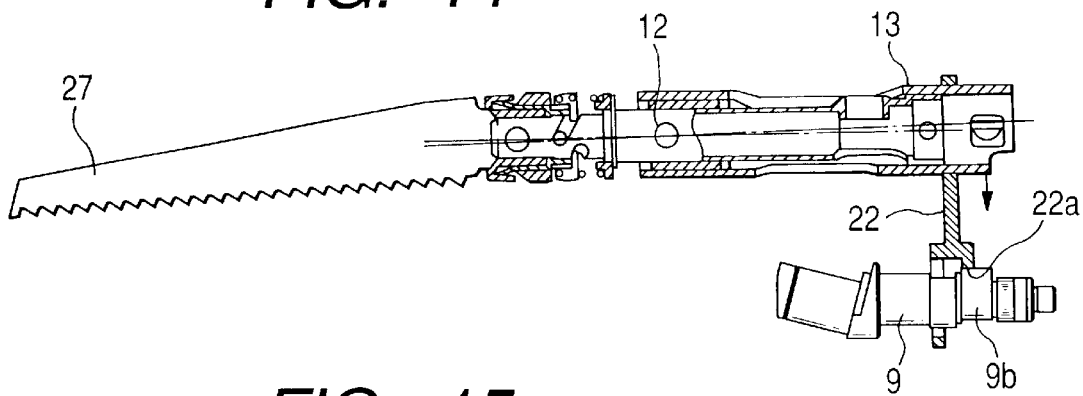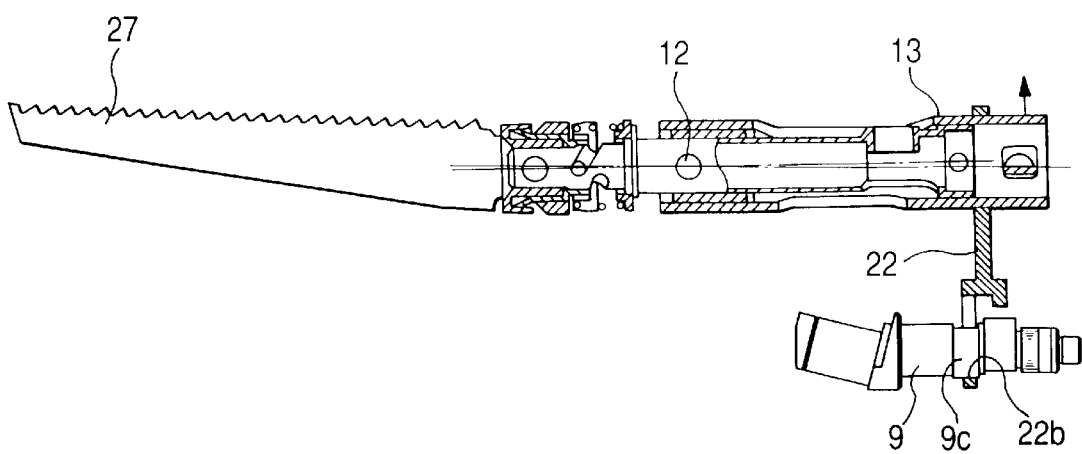

(a)      (b)      (c)      (d)

CUTTING MECHANISM FOR A SABER SAW

BACKGROUND OF THE INVENTION

The present invention relates to saber saws. Various saber saws have been conventionally developed to cut or saw woody or steel materials or pipes in the housing or building construction sites or similar fields.

Conventional saber saws are basically classified into first and second types. According to a saber saw of the first type, a saw blade is reciprocated along a linear path. According to a saber saw of the second type, a saw blade is moved along an orbital path, for example, an elliptic path. The second type is also referred to as the orbital cutting type.

The conventional saber saws of the orbital cutting type, for example disclosed in U.S. Pat. No. 3,945,120 and in U.S. Pat. No. 3,461,732, are preferable to cut relatively soft material, such as woody members.

FIG. 1 shows a conventional saber saw of the orbital cutting type. A secondary shaft 109 is driven by a drive shaft 108 (of a motor or a comparable driving source). The secondary shaft 109 is provided with an eccentric shaft portion 109b. A wobble plate 118 is attached around the secondary shaft 109. The wobble plate 118 converts the rotational motion of the secondary shaft 109 into a reciprocative movement. A saw blade 127 is attached to the front end of a plunger 120. The plunger 120 is slidably coupled in a guide sleeve 113. The guide sleeve 113 is swingable about its pivot 'A' defined by an axis which is perpendicular to the guide sleeve 113 and is fixed to a gear cover 106. When the secondary shaft 109 rotates, the plunger 120 reciprocates in the back-and-forth direction in accordance with the motion converting mechanism of the wobble plate 118 which converts the rotation of secondary shaft 109 into the reciprocation of plunger 120.

A link plate 135 is attached to a rear portion of guide sleeve 113. The link plate 135, extending downward from the guide sleeve 113, has a distal end. The distal end of link plate 135 is brought into contact with the eccentric shaft portion 109b of secondary shaft 109. During sawing operation, the saw blade 127 receives a reaction force F1 which causes a clockwise moment about the pivot 'A' of guide sleeve 113. The rear end of guide sleeve 113 moves downward. The distal end (i.e., lower end) of link plate 135 is depressed against the eccentric shaft portion 109b of secondary shaft 109. The eccentric shaft portion 109b rotates in accordance with the rotation of secondary shaft 109. The rotation of eccentric shaft portion 109b is transmitted to the guide sleeve 113 via the link plate 135. Thus, the guide sleeve 113 swings in the up-and-down direction. As a result, the plunger 120 causes a mixed motion of the reciprocative motion and the swing motion.

The moving path of the saw blade 127 realized by the above-described mixed (i.e., reciprocative/swing) motion of the plunger 120 is dependent on the setting of a phase angle of eccentric shaft portion 109b relative to the plunger 120. FIG. 2 shows an orbital path of the saw blade 127 realized by the above-described mixed (i.e., reciprocative/swing) motion of the plunger 120.

According to the orbital sawing operation shown in FIG. 2, the saw blade 127 chiefly cuts into a material 136 when the saw blade 127 is drawn toward the saber saw body (i.e., during the cutting stroke). This improves the efficiency of cutting work for sawing a wood or a relatively soft material.

FIG. 3 shows an ordinary sawing operation of a saber saw. A saw blade 127 with sawteeth is attached facedown to the front end of a saber saw body held by a user (not shown) in an upright position. FIG. 4 shows another sawing operation of a saber saw held by a user (not shown) in an upside-down condition. The saw blade 127 is inversely attached to the saber saw body.

According to the above-described conventional saber saw of the orbital cutting type shown in FIG. 1, the sawing operation cannot be performed properly if the saw blade 127 is inversely attached to the saber saw body. More specifically, as shown in FIG. 5, the saw blade 127 receives a reaction force F2 from the material 136 under the condition where the saber saw is held in the upside-down condition. The reaction force F2 causes a clockwise moment about the pivot 'A' of guide sleeve 113. The rear end of guide sleeve 113 moves downward. The distal end (i.e., an upper end in this case) of link plate 135 is released from the eccentric shaft portion 109b of secondary shaft 109. Thus, the rotational motion of eccentric shaft portion 109b is not transmitted to the guide sleeve 113. The plunger 120 does not cause a swing motion. The saw blade 127 attached to the front end of plunger 120 cannot move along an orbital path.

The saber saw disclosed in U.S. Pat. No. 3,945,120 discloses a member equivalent to the link plate 135 rotatably attached to the eccentric shaft portion 109b. If the linking mechanism disclosed in U.S. Pat. No. 3,945,120 is employed in the saber saw shown in FIG. 1, the plunger 120 will swing in the up-and-down direction even when the saw blade 127 is inversely attached to the saber saw body. The saw blade 127 will move along an orbital path shown in FIG. 6. However, in this case, as better understood from the comparison between FIG. 2 and FIG. 6, the saw blade 127 moves in the opposite direction (refer to the direction of arrow) due to the unchanged phase relationship between the eccentric shaft portion 109b and the plunger 120.

According to the orbital sawing operation shown in FIG. 6, the saw blade 127 cannot smoothly cut into the material 136 when the saw blade 127 is drawn toward the saber saw body (i.e., during the cutting stroke) because the saw blade 127 moves along an upper arc line far from the material 136.

In this manner, none of the conventional saber saws teach a technical solution for enabling proper orbital sawing operation even when the saw blade 127 is attached inversely to the saber saw body.

The applicant's copending application Ser. No. 09/468,127, now patented as U.S. Pat. No. 6,282,797, discloses a saber saw of the orbital cutting type which can operate properly even when a saw blade is inversely attached to a plunger or a carrier.

PCT internal publication No. WO 98/07544 discloses a saber saw that approaches the better cutting performance of orbital saws without the complexity required for orbital motion and achieves a forward motion of the saw blade during the cutting stroke without resorting to orbital motion.

The proposed saber saws are still complicated in structure and need to be more simplified.

SUMMARY OF THE INVENTION

In view of the foregoing problems of the prior art, an object of the present invention is to provide a saber saw of the orbital cutting type which can operate properly even when a saw blade is inversely attached to a saber saw body, thereby improving the efficiency of cutting work.

In order to accomplish this and other related objects, the present invention provides a first saber saw comprising a housing for accommodating a motor and a driven shaft rotatably supported by the housing and rotated by the motor. A plunger causes reciprocative motion with respect to the housing. A saw blade is attached to a front end of the plunger. A first motion converting mechanism, interposed between the driven shaft and the plunger, converts the rotational motion of the driven shaft into the reciprocative motion of the plunger. A second motion converting mechanism, interposed between the driven shaft and the plunger, converts the rotational motion of the driven shaft into the swing motion of the plunger. A plurality of eccentric shaft portions are formed on the driven shaft. The second motion converting mechanism includes contact portions selectively brought into contact with the eccentric shaft portions of the driven shaft.

According to a preferred embodiment of the present invention, the first saber saw of the present invention further comprises a guide sleeve. The guide sleeve slidably holds the plunger so as to allow the reciprocative motion and is hingedly supported about a pivot fixed to the housing. The guide sleeve can swing in a direction normal to a reciprocating direction of the plunger. The second motion converting mechanism includes a guide member attached to the guide sleeve. The guide member has the contact portions selectively brought into contact with the eccentric shaft portions of the driven shaft.

According to the preferred embodiment of the present invention, the plurality of eccentric shaft portions are two, first and second, eccentric shaft portions formed on the driven shaft. A predetermined phase difference is provided between the first and second eccentric shaft portions of the driven shaft. For example, the phase difference between the first and second eccentric shaft portions is 180° or 225°. The first and second eccentric shaft portions are offset from each other in an axial direction of the driven shaft. An eccentric amount of the first eccentric shaft portion is identical to or different from an eccentric amount of the second eccentric shaft portion.

According to the preferred embodiment of the present invention, the contact portions of the second motion converting mechanism are two, first and second, contact portions selectively brought into contact with first and second eccentric shaft portions formed on the driven shaft. The first and second contact portions are offset from each other in an axial direction of the driven shaft. The first contact portion is opposed to the first eccentric shaft portion and the second contact portion is opposed to the second eccentric shaft portion.

According to the preferred embodiment of the present invention, the second motion converting mechanism includes a locking mechanism for restricting the swing motion of the plunger. The first and second contact portions are released from the first and second eccentric shaft portions when the locking mechanism locks the plunger, thereby keeping the second motion converting mechanism in a neutral condition.

It is also possible that the second motion converting mechanism includes independent or separate guide members for the first and second contact portions.

As a practical example, the guide member of the second motion converting mechanism is a contact plate extending in a cantilever fashion from the guide sleeve toward the driven shaft. The contact plate has a projecting portion and a rectangular ring portion which are formed at a distal end of this contact plate. The driven shaft extends through an opening of the rectangular ring portion of the contact plate. The first contact portion is formed at a distal end surface of the projecting portion. The second contact portion is formed at an inner surface of the rectangular ring portion.

Furthermore, the present invention provides a second saber saw comprising a housing for accommodating a motor and a bevel gear rotatably supported by the housing and rotated by the motor. A plunger causes reciprocative motion with respect to the housing and has a front end to which a saw blade is attached. A guide sleeve slidably holds the plunger so as to allow the reciprocative motion and is hingedly supported about a pivot fixed to the housing. The guide sleeve can swing in a direction normal to a reciprocating direction of the plunger. A first motion converting mechanism, interposed between the bevel gear and the plunger, converts the rotational motion of the bevel gear into the reciprocative motion of the plunger. A second motion converting mechanism, interposed between the bevel gear and the plunger, converts the rotational motion of the bevel gear into the swing motion of the plunger. First and second slant surfaces are formed on the bevel gear. The second motion converting mechanism includes a guide member attached to the guide sleeve. The guide member has first and second contact portions selectively brought into contact with the first and second slant surfaces of the bevel gear.

It is preferable for the second saber saw that the guide member of the second motion converting mechanism is a contact plate extending in a cantilever fashion from the guide sleeve toward the bevel gear. The contact plate has the first contact portion opposed to the first slant surface of the bevel gear and the second contact portion opposed to the second slant surface of the bevel gear.

BRIEF DESCRIPTION OF THE DRAWINGS

The above and other objects, features and advantages of the present invention will become more apparent from the following detailed description which is to be read in conjunction with the accompanying drawings, in which:

FIG. 13A is a side view of a contact plate of the saber saw in accordance with the first embodiment of the present invention;

FIG. 13B is a front view of the contact plate of the saber saw in accordance with the first embodiment of the present invention;

FIG. 14 is a partly cross-sectional side view showing an operation of the cutting mechanism of the saber saw in accordance with the first embodiment of the present invention;

FIG. 15 is a partly cross-sectional side view showing an operation of the cutting mechanism of the saber saw in accordance with the first embodiment of the present invention;

DESCRIPTION OF A PREFERRED EMBODIMENT

First Embodiment

Figure 1:
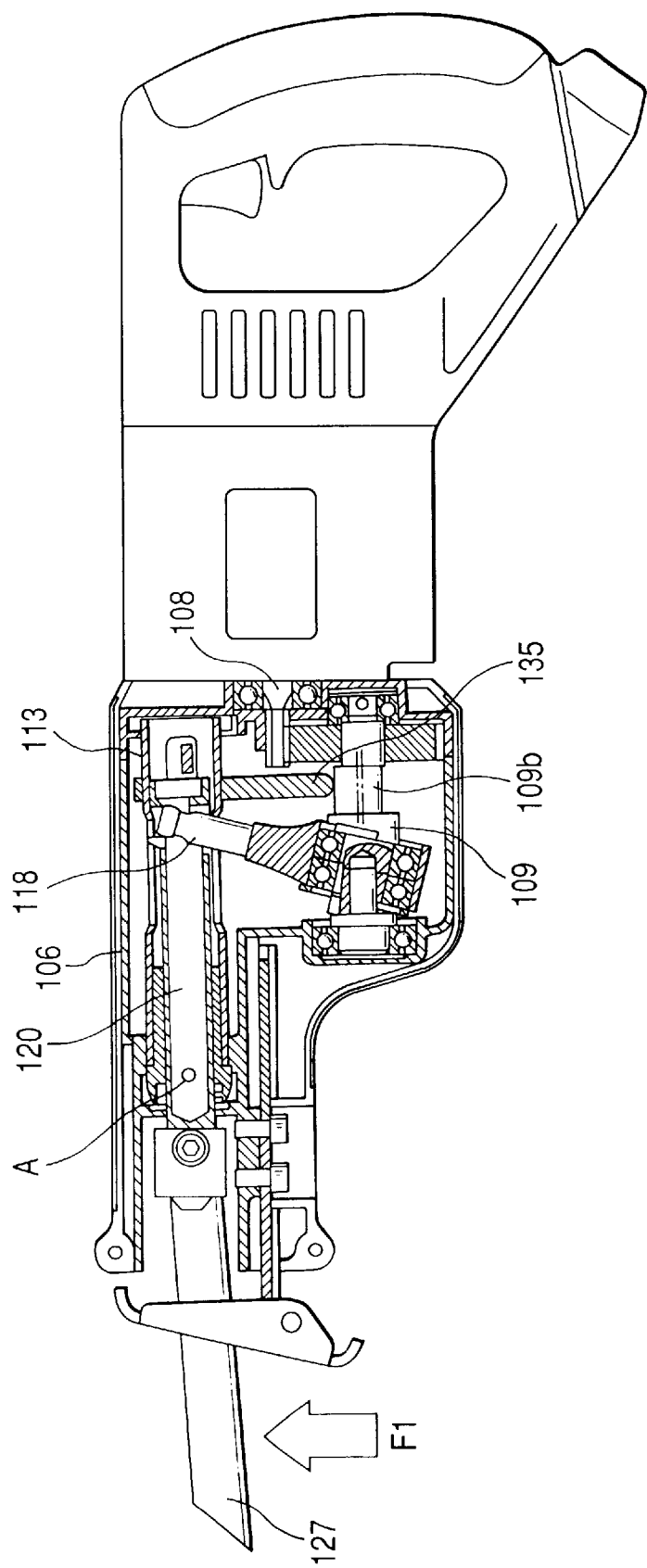
FIG. 1 is a partly cross-sectional view showing a conventional saber saw.
Figure 2:
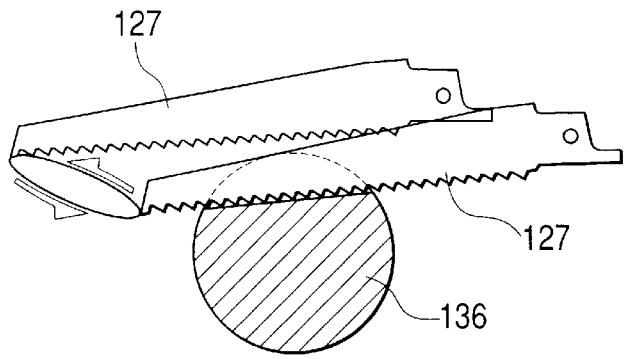
FIG. 2 is an enlarged view showing an orbital path of a saw blade of the conventional saber saw shown in FIG. 1.
Figure 3:
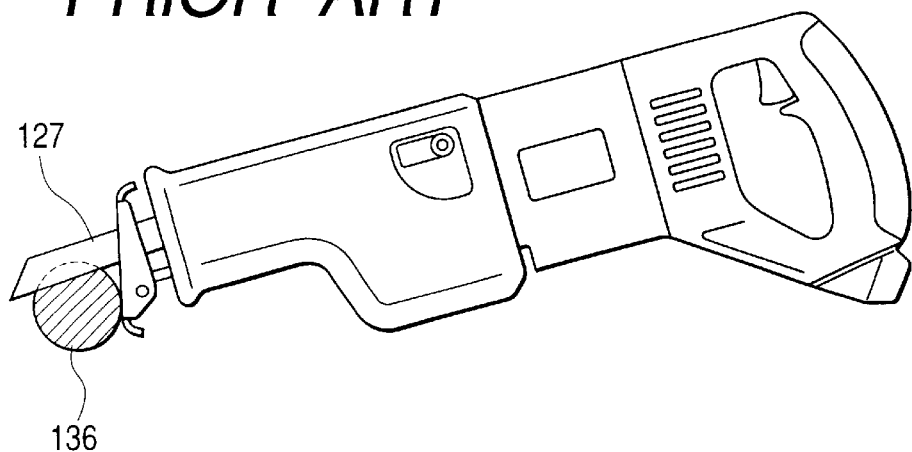
FIG. 3 is a side view showing a sawing operation of a saber saw.

A preferred embodiment of the present invention will be explained with reference to attached drawings. Identical parts are denoted by the same reference numerals throughout the views. The directions used in the following explanation are defined based on a saber saw held in a normal (i.e., upright) position held by a user with a longitudinal axis extending in a horizontal direction.

Motor Section

An electrically driven motor 1 is accommodated in a resin-made motor housing 2. A handle 3 is connected to the rear end of the motor housing 2. The handle 3 is equipped with a switch 4 which allows a user to on-and-off control power supply to the electric motor 1.

Speed-Reducing Mechanism

An inner cover 5, which is an aluminum product, is connected to the front end of the motor housing 2. A gear cover 6, which is also an aluminum product, is connected to the front end of the inner cover 5 for accommodating a driving force transmitting mechanism which is described later. The electric motor 1 has a motor shaft 7 (i.e., a primary or drive shaft) serving as a rotary member outputting a rotational driving force of the electric motor 1. A driving gear 8 is formed at the front end of the motor shaft 7. A secondary shaft 9 is positioned in parallel with the motor shaft 7. The inner cover 5 supports the front end of motor shaft 7 and the rear end of secondary shaft 9. A driven gear 10 is attached on the secondary shaft 9 so as to mesh with the driving gear 8. The driving gear 8 and the driven gear 10 cooperate as a speed reducing mechanism. The rotational force of electric motor 1 is transmitted to the secondary shaft 9 via the speed reducing mechanism. The secondary shaft 9 rotates at a reduced speed.

A slant shaft portion 9a is formed at the front end of the secondary shaft 9. The slant shaft portion 9a inclines approximately 14° with respect to the secondary shaft 9 (i.e., with respect to an axis of the driven gear 10).

A sub shaft 11 is attached to the front end of secondary shaft 9. The sub shaft 11 is coaxial with the secondary shaft 9 (i.e., the axis of driven gear 10). The motor housing 2, the inner cover 5, and the gear cover 6 cooperatively constitute a housing of the saber saw.

Reciprocating Shaft Supporting Structure

Figure 8:
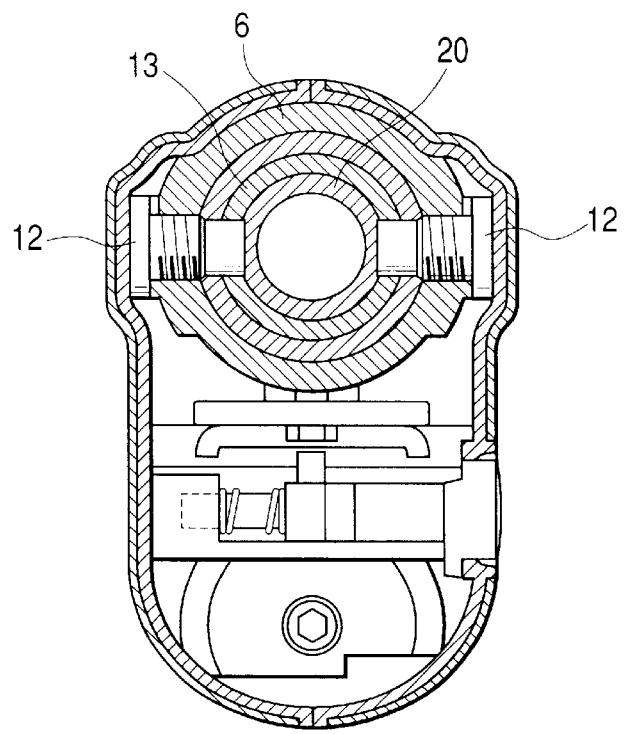
FIG. 8 is a partly cross-sectional view of the saber saw taken along a line B—B of FIG. 7.

Two axle bolts 12 are opposed and coaxially attached to the front end of the gear cover 6. A guide sleeve 13 is hingedly supported at the inner ends of the axle bolts 12 and is swingable about the common axis of the axle bolts 12 (refer to FIG. 8). The common axis of the axle bolts 12 serves as a pivot for allowing the guide sleeve 13 to swing in an up-and-down direction normal to a reciprocating direction of the plunger 20. Two opposed rectangular through holes 14 are opened at the rear end of the guide sleeve 13. A change shaft 15 is rotatably installed on the inside wall of the inner cover 5. The change shaft 15 is inserted into the rectangular through holes 14 (refer to FIG.

Figure 9:
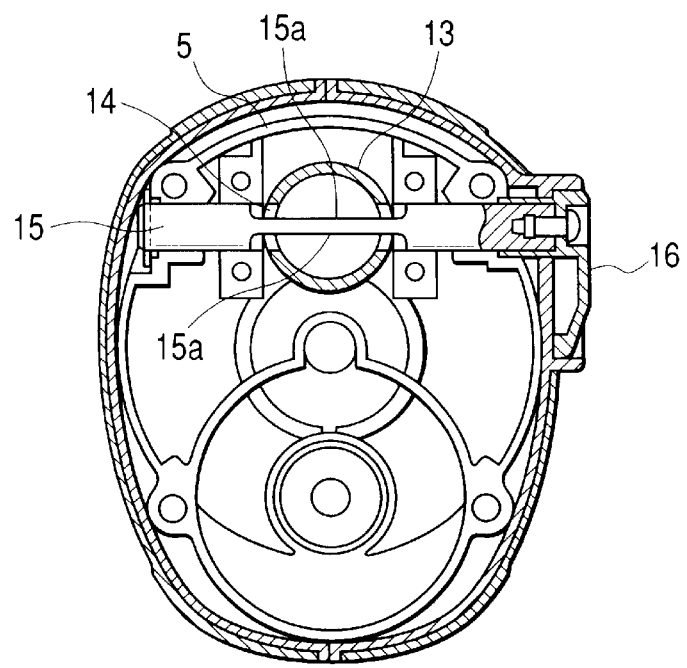
FIG. 9 is a partly cross-sectional view of the saber saw taken along a line C—C of FIG. 7.

9). More specifically, the change shaft 15 has two symmetric flat surfaces 15a formed at opposite sides of the central region thereof. The flat surfaces 15a extend in a wider lateral region larger than the diameter of the guide sleeve 13. A change lever 16 is securely connected to the axial end of the change shaft 15. The change shaft 15 rotates in accordance with a turning operation of the change lever 16. The rotation of the change shaft 15 selectively allows or restricts the swing motion of the guide sleeve 13 about the pivot thereof. FIG. 9 shows the guide sleeve 13 which is released from restriction of the change shaft 15 and swingable within a predetermined angular range.

Rotation-Reciprocation Converting Mechanism (for Plunger)

A wobble plate 18 has a sleevelike base portion coupled around the slant shaft portion 9a via two bearing rings 17. The wobble plate 18 has a swing shaft 18a integrally extending from the sleevelike base portion in a direction perpendicular to the axis of the slant shaft portion 9a. A ball portion 18b is formed at the distal end of the swing shaft 18a. A cylindrical bearing metal 19 is press fitted into the front end portion of the cylindrical guide sleeve 13. The plunger 20 reciprocates along the cylindrical inner wall of the bearing metal 19. The plunger 20 has a larger-diameter portion 20a at the rear end thereof. A slight clearance is provided between the larger-diameter portion 20a and the cylindrical inner wall of the guide sleeve 13. The swing shaft 18a of the wobble plate 18 is inserted into upper and lower openings formed on the larger-diameter portion 20a of the plunger 20. An upper opening 20b of the larger-diameter portion 20a is loosely coupled with the ball portion 18b of the swing shaft 18a. The ball portion 18b can roll along the cylindrical edge of the upper opening 20b. The lower opening of the larger-diameter portion 20a is so wide that the swing movement of the swing shaft 18a is not blocked by the lower opening of the larger-diameter portion 20a. With the above-described arrangement, the rotational motion of the secondary shaft 9 is converted into the reciprocative motion of the plunger 20.

Blade Attaching & Detaching Mechanism

A blade attaching portion 20c is formed at the front end of the plunger 20. The blade attaching portion 20c comprises a slit 20d into which the saw blade 27 is inserted and locked by a stepped blade locking pin 30. Cylindrical blade holders 28 and 29 are provided around the blade attaching portion 20c. The blade holder 28 is axially shiftable toward the rear end of the plunger 20 while it rotates against a resilient force. The stepped blade locking pin 30 retracts in response to the axially rearward and rotational movement of the blade holder 28. This mechanism allows the user to insert the saw blade 27 into the slit 20d when the user holds the blade holder 28 at the rearward position. When released, the blade holder 28 shifts in the axially forward direction and returns its home position while it rotates in the opposite direction. With this returning motion, the stepped blade locking pin 30 engages the saw blade 27 and firmly fixes the saw blade 27 in the slit 20d of the plunger 20. Regarding the direction of the saw blade 27, this blade holding mechanism allows the user to set the saw blade 27 upside down when attaching it to the blade attaching portion 20c of the plunger 20. The applicants' earlier U.S. patent application Ser. No. 09/426,646 filed Oct. 25, 1999, now patented as U.S. Pat. No. 6,276,065, discloses the more detailed structure for the blade attaching and detaching mechanism.

Front Holding Structure

A resin-made front cover 24 partly covers the housing of the saber saw, i.e., the motor housing 2, the inner cover 5 and the gear cover 6. A base 25 is attached to the front end of the gear cover 6 and is shiftable in the axial direction via a fixing lever 26. The base 25 stabilizes the position of the saber saw with respect to a material 36 to be cut by the saber saw.

Swing Sawing Mechanism

Figure 10:
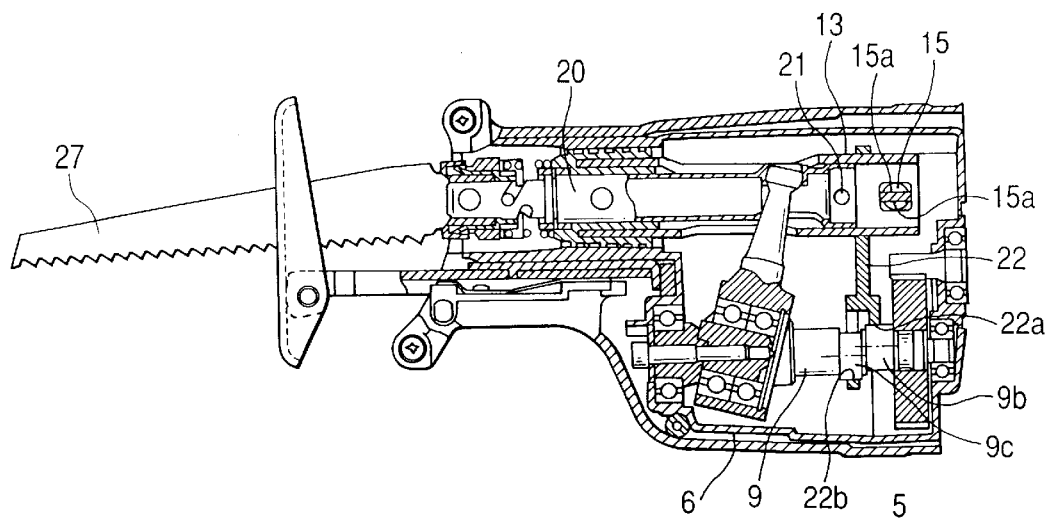
FIG. 10 is a partly cross-sectional view showing essential arrangement of a cutting mechanism of the saber saw in accordance with a first embodiment of the present invention.
Figure 11:
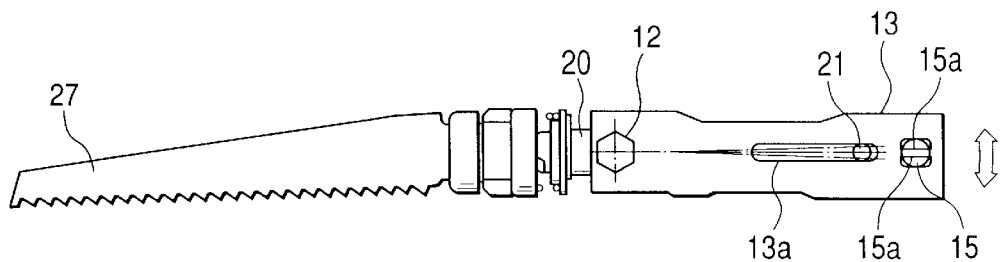
FIG. 11 is a side view showing essential components of the cutting mechanism of the saber saw in accordance with the first embodiment of the present invention.

As illustrated in FIGS. 10 and 11, a roller shaft 21 is provided at the rear part of plunger 20 and loosely coupled in axially elongated holes 13a opened on the guide sleeve 13. The roller shaft 21 has both ends rotatably supporting swing rollers thereabout. The axially elongated holes 13a guide the roller shaft 21 via the swing rollers to reciprocate together with the plunger 20. An altitudinal width of each elongated hole 13a is slightly larger than a diameter of the roller shaft 21. The guide sleeve 13 and the roller shaft 21 cooperatively prevent the plunger 20 from rotating in the circumferential direction, thereby providing an anti-roll mechanism for the saw blade 27.

As illustrated in FIG. 10, a contact plate 22 is attached to the guide sleeve 13 in a cantilever fashion so as to extend from the guide sleeve 13 toward the secondary shaft 9. The contact plate 22 has one end (i.e., proximal end) securely fixed to the guide sleeve 13. The contact plate 22 extends in a direction normal to the axis of plunger 20. The contact plate 22 moves in the up-and-down direction togther with the guide sleeve 13 when the guide sleeve 13 swings about its pivot (i.e., the common axis of axle bolts 12). The contact plate 22 serves as guide member of the present invention.

Figures 12A, 12B:
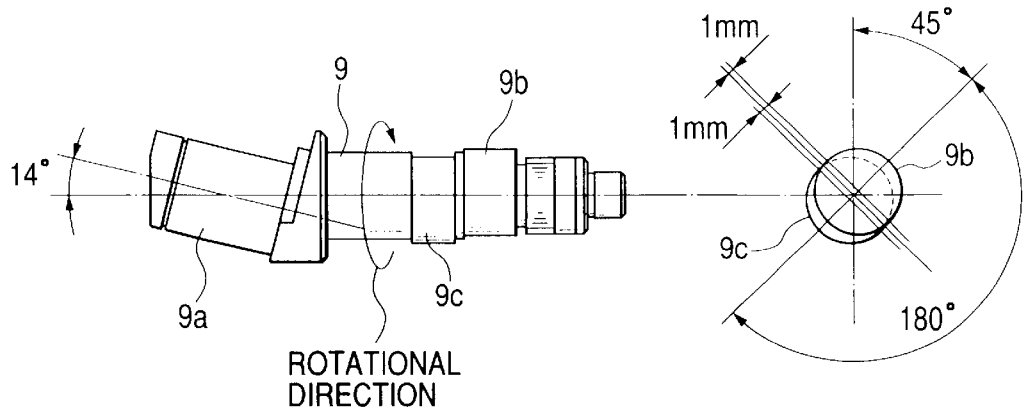
FIG. 12A is a side view showing a secondary shaft of the saber saw in accordance with the first embodiment of the present invention.
FIG. 12B is a front view showing an offset relationship between first and second eccentric shaft portions of the secondary shaft of the saber saw in accordance with the first embodiment of the present invention.

As illustrated in FIGS. 12A and 12B, the secondary shaft 9 has a first eccentric shaft portion 9b whose eccentric amount is 1 mm with respect to the axis of secondary shaft 9. The first eccentric shaft portion 9b has a phase difference of 45° with respect to the slant shaft portion 9a. Furthermore, the secondary shaft 9 has a second eccentric shaft portion 9c whose eccentric amount is 1 mm with respect to the axis of secondary shaft 9. The second eccentric shaft portion 9c has a phase difference of 180° with respect to the first eccentric shaft portion 9b. The second eccentric shaft portion 9c is offset from the first eccentric shaft portion 9b in the axial direction of the secondary shaft 9.

As illustrated in FIGS. 13A and 13B, a projecting portion 22d and a rectangular ring portion 22c are formed at the distal end of the contact plate 22. The secondary shaft 9 extends through the opening of rectangular ring portion 22c. The contact plate 22 has a first contact portion 22a formed at a distal (i.e., lower) end surface of the projecting portion 22d. The contact plate 22 has a second contact portion 22b formed at an inner surface (i.e., an upper surface of a lower side bar) of the rectangular ring portion 22c. The first contact portion 22a is opposed to the first eccentric shaft portion 9b in the longitudinal direction (i.e., in the up-and-down direction) of the contact plate 22. The second contact portion 22b is opposed to the second eccentric shaft portion 9c in the longitudinal direction (i.e., in the up-and-down direction) of the contact plate 22. The second contact portion 22b is offset from the first contact portion 22a in the axial direction of the secondary shaft 9.

Figure 16:
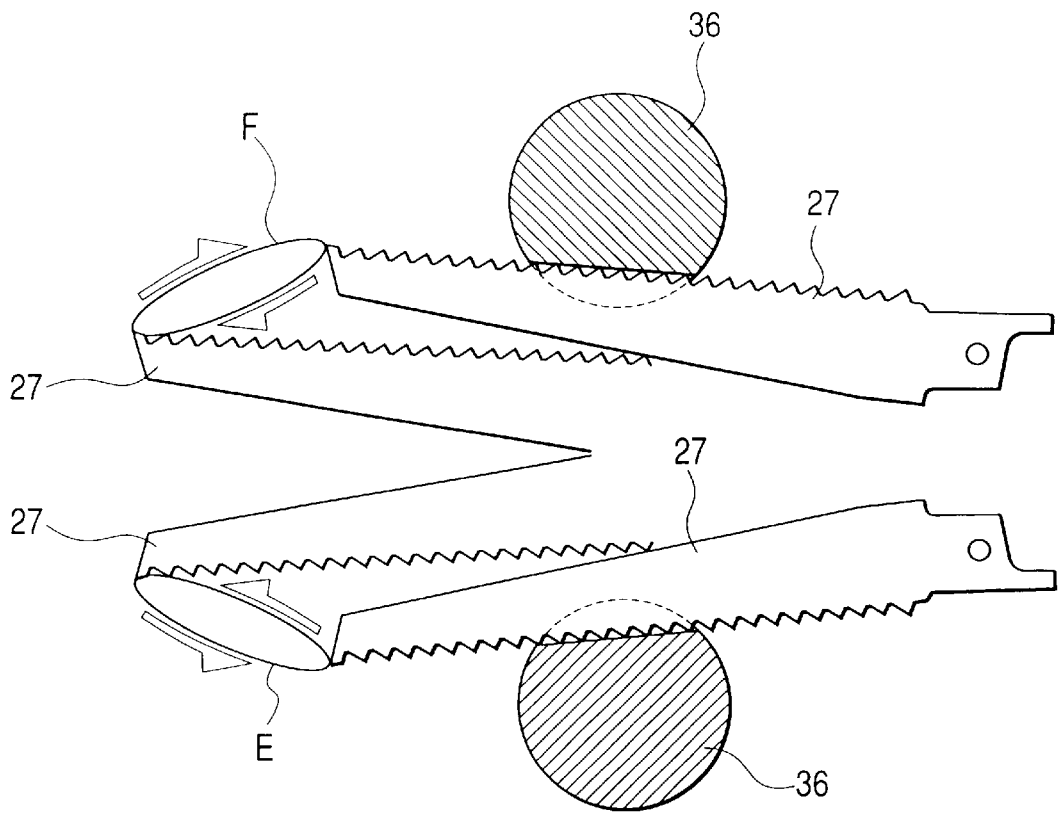
FIG. 16 is an enlarged view showing orbital paths of the saw blade of the saber saw in accordance with the first embodiment of the present invention.

As illustrated in FIG. 14, when the guide sleeve 13 swings downward about its pivot (i.e., the common axis of axle bolts 12), the first contact portion 22a of contact plate 22 is brought into contact with an outer cylindrical surface of the first eccentric shaft portion 9b of the secondary shaft 9. This arrangement causes the saw blade 27 to move along an orbital path 'E' shown in FIG. 16.

As illustrated in FIG. 15, when the guide sleeve 13 swings upward about its pivot (i.e., the common axis of axle bolts 12), the second contact portion 22b of contact plate 22 is brought into contact with an outer cylindrical surface of the second eccentric shaft portion 9c of the secondary shaft 9. This arrangement causes the saw blade 27 to move along an orbital path 'F' shown in FIG. 16.

Accordingly, the present invention enables a user to perform an orbital sawing operation of the saber saw regardless of the direction (normal or upside-down) of saw blade 27 attached to the saber saw body. Thus, even if the saw blade 27 is inversely attached to the saber saw body, the saber saw can perform the orbital sawing operation properly.

Sawing Operation with Linear Reciprocative Motion

Figure 17:
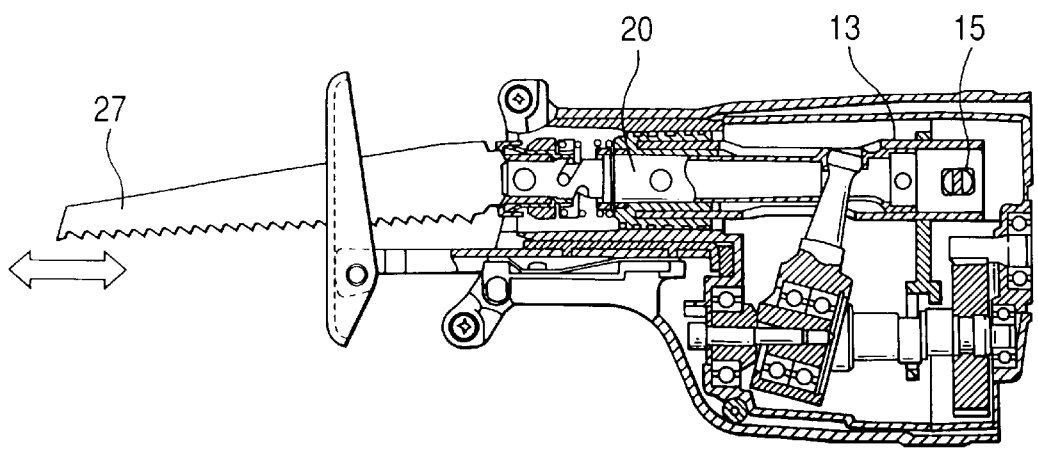
FIG. 17 is a partly cross-sectional view showing a linear sawing operation of the saber saw in accordance with the first embodiment of the present invention.

FIG. 17 shows sawing operation of the saber saw in a condition where the change shaft 15 locks the guide sleeve 13 to restrict the swing motion of the guide sleeve 13 (i.e., the plunger 20). In this case, the change shaft 15 is in an upright position where the flat surfaces 15a of the change shaft 15 are substantially perpendicular to the axis of the guide sleeve 13. The upper and lower edges of the upright change shaft 15 are firmly engaged with the rectangular through holes 14 of the guide sleeve 13. The change shaft 15 inhibits the swing motion of the guide sleeve 13 about the common axis of the axle bolts 12.

During sawing operation, a user applies a downward pressing force to the saw blade 27 via the saber saw body. As the swing motion of the guide sleeve 13 is inhibited in this condition, the first and second contact portions 22a and 22b of contact plate 22 are not brought into contact with the first and second eccentric shaft portions 9b and 9c of the secondary shaft 9. In this respect, the contact plate 22 is in a neutral position. As a result, the plunger 20 and the saw blade 27 perform simple linear reciprocation. The simple linear reciprocation of the saw blade 27 is suitable for cutting a hard material such as a steel workpiece which generates a great reaction force.

Orbital Sawing Operation with Saw Blade Faced Down

Figure 18:
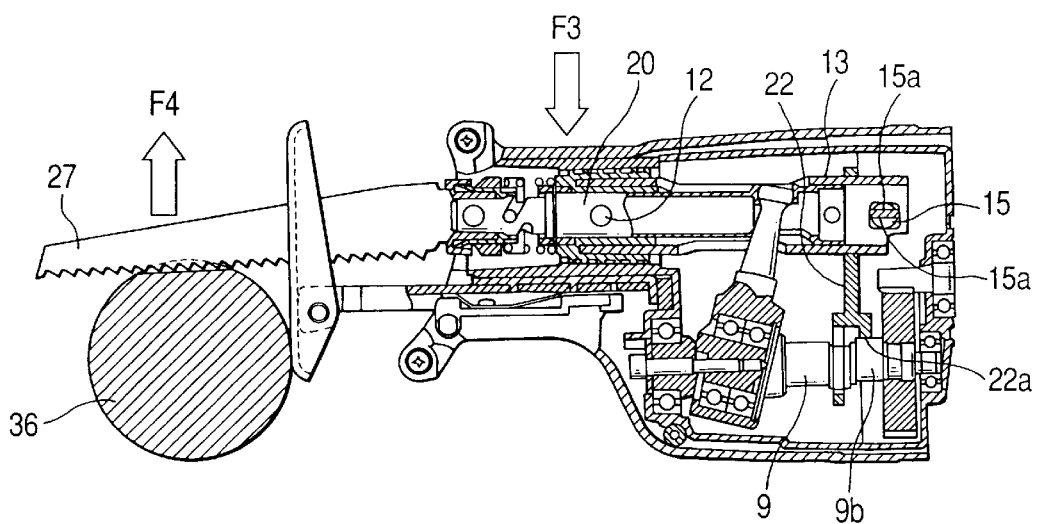
FIG. 18 is a partly cross-sectional view showing an orbital sawing operation of the saber saw in accordance with the first embodiment of the present invention.

FIG. 18 shows the saw blade 27 attached to the plunger 20 normally held by a user with sawteeth facing downward. The saber saw is in a condition where the change shaft 15 unlocks the guide sleeve 13 to allow the swing motion of the plunger 20. In this case, the change shaft 15 is in a lying position where the flat surfaces 15a of the change shaft 15 are substantially parallel to the axis of the guide sleeve 13. The change shaft 15 is released from restriction of the rectangular through holes 14 of the guide sleeve 13. Thus, the guide sleeve 13 is allowed to swing about the common axis of the of the axle bolts 12.

During sawing operation, a user applies a downward pressing force F3 to the saw blade 27 via the saber saw body. The plunger 20 supporting the saw blade 27 receives an upward reaction force F4 from a material 36 to be cut via the saw blade 27 and swings clockwise about the common axis of the axle bolts 12 in FIG. 18. The swing movement of the plunger 20 is transferred to the guide sleeve 13. The guide sleeve 13 lowers its rear end downward. The first contact portion 22a of contact plate 22 is depressed against the first eccentric shaft portion 9b of the secondary shaft 9, while the second contact portion 22b of contact plate 22 is released from the second eccentric shaft portion 9c. Thus, the first eccentric shaft portion 9b guides the sleeve 13 to cause a swing motion. The guide sleeve 13 (together with the plunger 20) swings about the common axis of the axle bolts 12 in a predetermined angular range (e.g., within an angle of 0.44° to 1.54°), while the plunger 20 reciprocates in the axial direction. As a result, the plunger 20 and the saw blade 27 perform orbital reciprocation. The saw blade 27 moves along an arc line as shown in FIG. 20.

Figure 19:
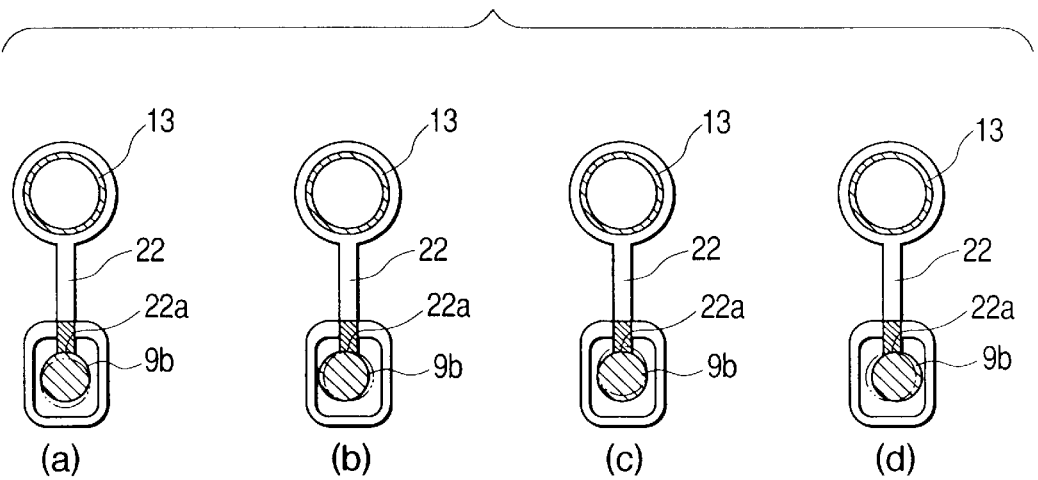
FIG. 19 is a view showing positional relationship between the contact plate and the first eccentric shaft portion of the secondary shaft of the saber saw in accordance with the first embodiment of the present invention.
Figure 20:
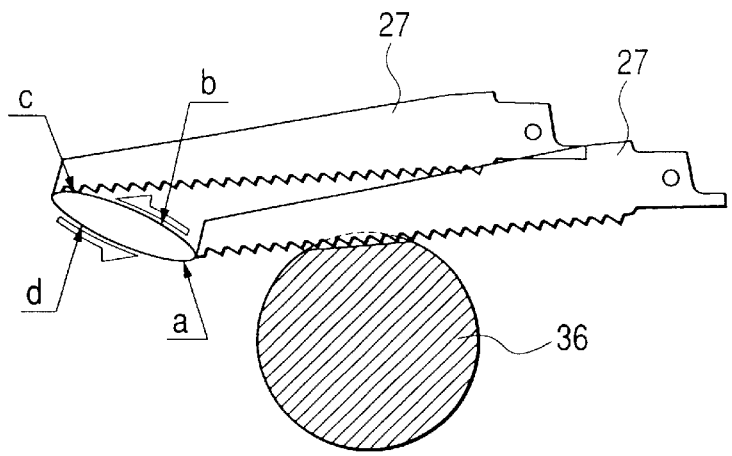
FIG. 20 is an enlarged view showing an orbital path of the saw blade of the saber saw during the orbital sawing operation shown in FIG. 18.

In FIG. 20, respective points 'a', 'b', 'c', and 'd' indicate the momentary position of saw blade 27 to give better understanding to the positional relationship between the contact plate 22 and the first eccentric shaft portion 9b of secondary shaft 9 shown in FIGS. 19(a), (b), (c), and (d). When the saw blade 27 is positioned to the point 'a' of FIG. 20, the first eccentric shaft portion 9b offsets upward (i.e., the direction of 12 o'clock) with respect to the non-eccentric portion (indicated by alternate long and two short dashes line) of the secondary shaft 9 as shown in FIG. 19(a). When the saw blade 27 is positioned to the point 'b' of FIG. 20, the first eccentric shaft portion 9b offsets leftward (i.e., the direction of 9 o'clock) with respect to the non-eccentric portion of the secondary shaft 9 as shown in FIG. 19(b). When the saw blade 27 is positioned to the point 'c' of FIG. 20, the first eccentric shaft portion 9b offsets downward (i.e., the direction of 6 o'clock) with respect to the non-eccentric portion of the secondary shaft 9 as shown in FIG. 19(c). When the saw blade 27 is positioned to the point 'd' of FIG. 20, the first eccentric shaft portion 9b offsets rightward (i.e., the direction of 3 o'clock) with respect to the non-eccentric portion of the secondary shaft 9 as shown in FIG. 19(d).

Orbital Sawing Operation with Saw Blade Faced Up

Figure 4:
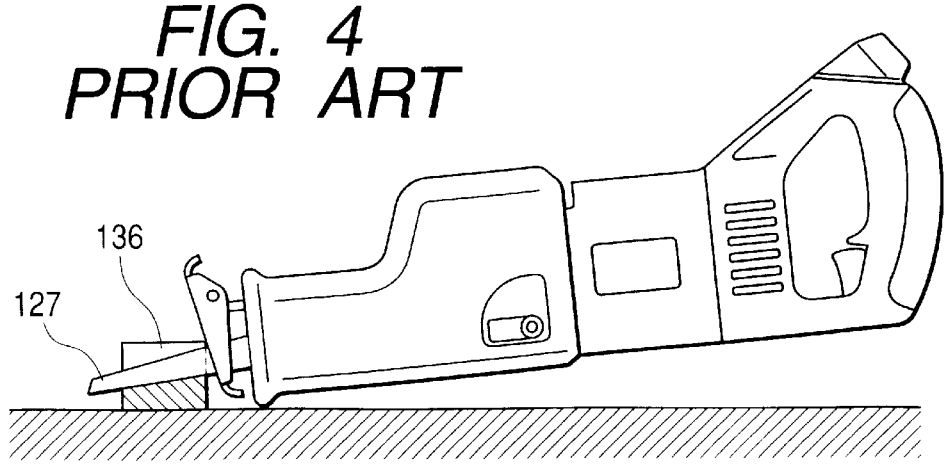
FIG. 4 is a side view showing another sawing operation of a saber saw.
Figure 5:
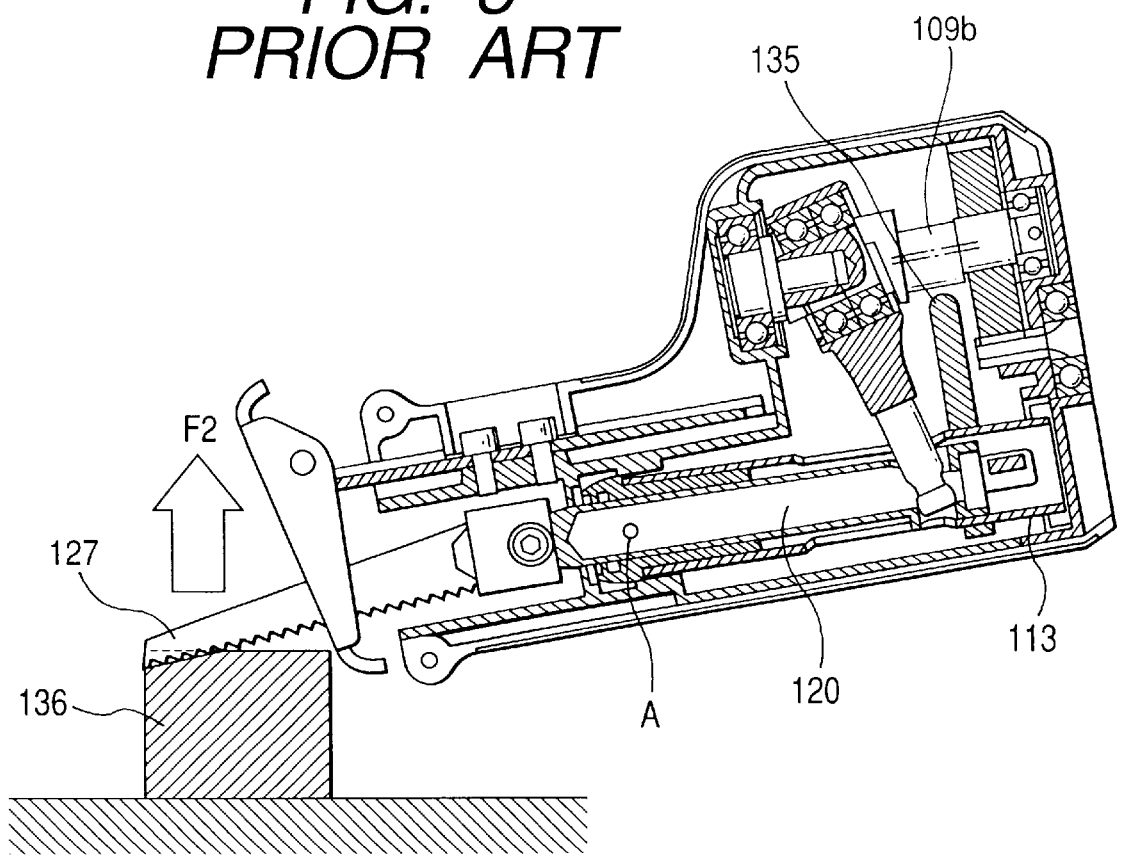
FIG. 5 is a view showing a sawing operation of the conventional saber saw shown in FIG. 1.
Figure 6:
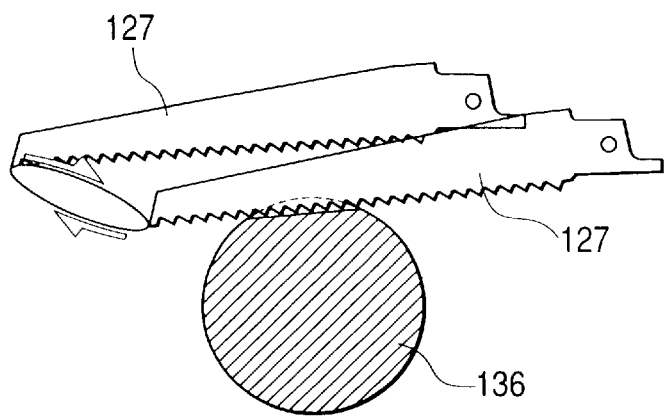
FIG. 6 is an enlarged view showing an imaginary orbital path of the saw blade based on the conventional saber saw shown in FIG. 1.
Figure 7:
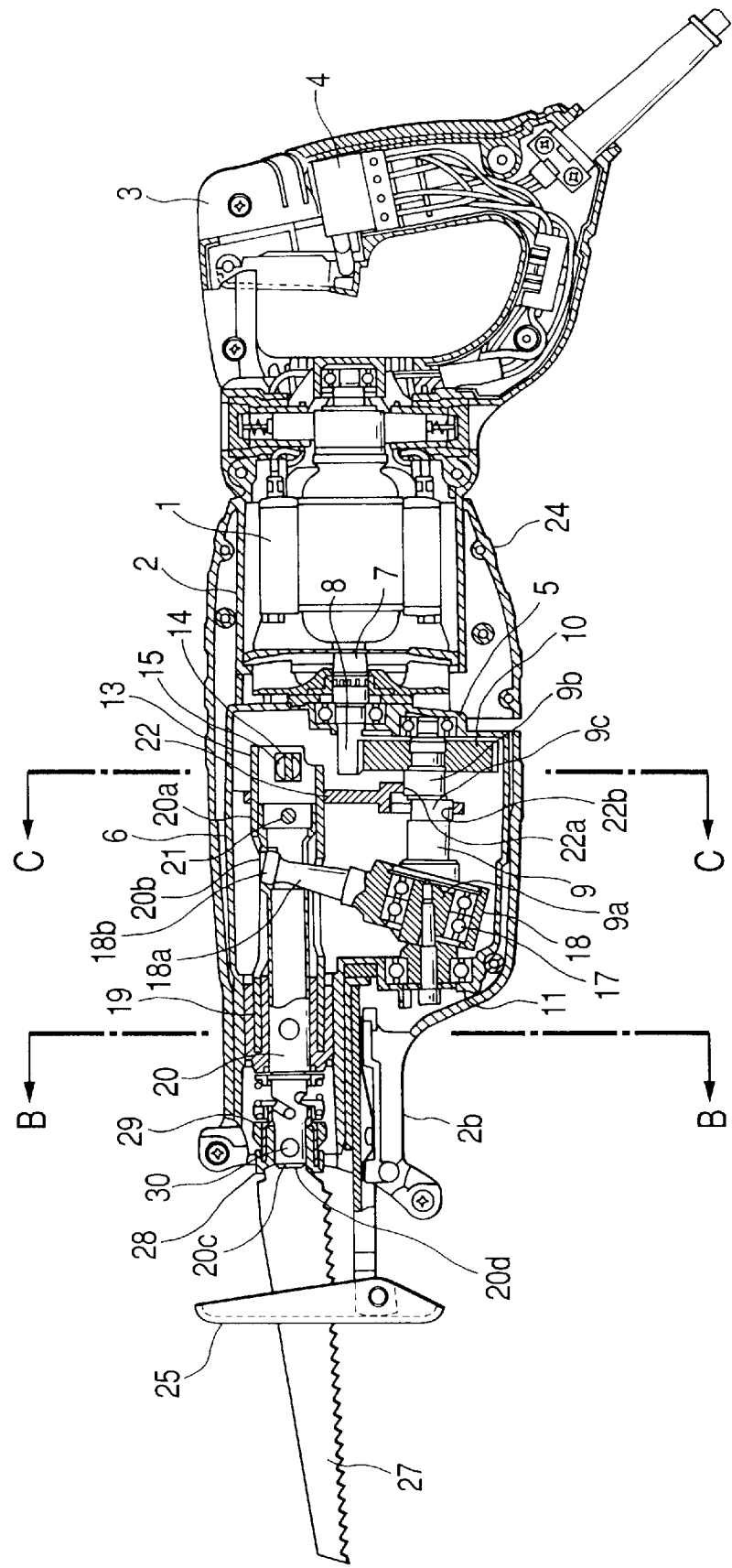
FIG. 7 is a partly cross-sectional view showing a saber saw in accordance with a preferred embodiment of the present invention.
Figure 21:
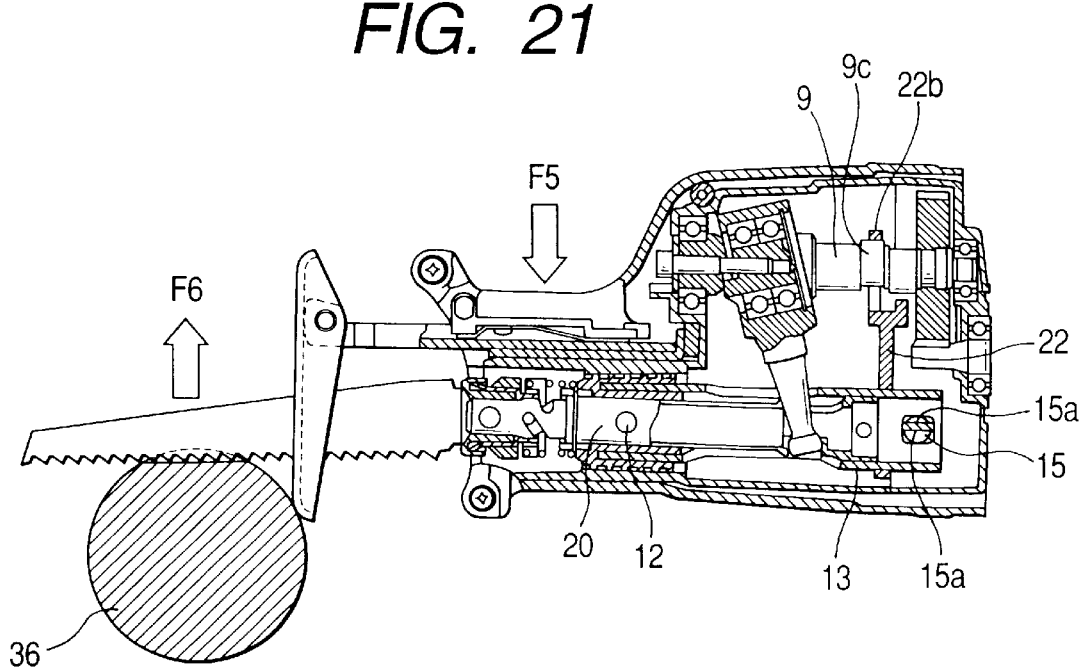
FIG. 21 is a partly cross-sectional view showing another orbital sawing operation of the saber saw in accordance with the first embodiment of the present invention.

FIG. 21 shows the saw blade 27 inversely attached to the plunger 20 with sawteeth facing downward in a condition where the saber saw body is held upside down by a user as shown in FIG. 4. The saber saw is in the condition where the change shaft 15 unlocks the guide sleeve 13 to allow the swing motion of the plunger 20. In this case, the change shaft 15 is in the lying position where the flat surfaces 15a of the change shaft 15 are substantially parallel to the axis of the guide sleeve 13. The change shaft 15 is released from restriction of the rectangular through holes 14 of the guide sleeve 13. The change shaft 15 allows the swing motion of the guide sleeve 13 about the common axis of the of the axle bolts 12.

During sawing operation, a user applies a downward pressing force F5 to the saw blade 27 via the saber saw body. The plunger 20 supporting the saw blade 27 receives an upward reaction force F6 from the material 36 to be cut via the saw blade 27 and swings clockwise about the common axis of the axle bolts 12. The swing movement of the plunger 20 is transferred to the guide sleeve 13. The guide sleeve 13 lowers its rear end downward. The second contact portion 22b of contact plate 22 is depressed against the second eccentric shaft portion 9c of the secondary shaft 9, while the first contact portion 22a of contact plate 22 is released from the first eccentric shaft portion 9b. Thus, the second eccentric shaft portion 9c guides the sleeve 13 to cause a swing motion. The guide sleeve 13 (together with the plunger 20) swings about the common axis of the axle bolts 12 in a predetermined angular range (e.g., within an angle of 0.44° to 1.54°), while the plunger 20 reciprocates in the axial direction. As a result, the plunger 20 and the saw blade 27 perform orbital reciprocation. The saw blade 27 moves along an arc line as shown in FIG. 23.

Figure 22:
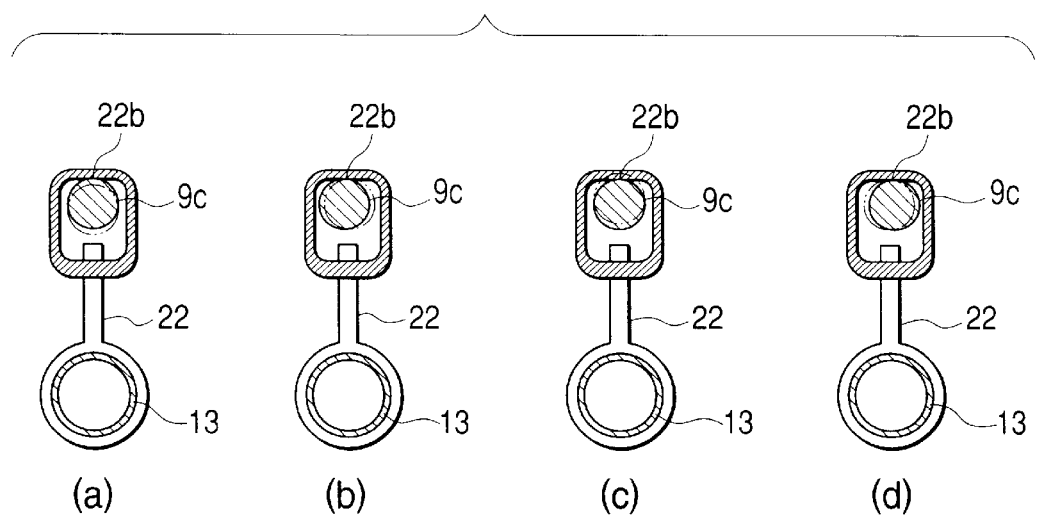
FIG. 22 is a view showing positional relationship between the contact plate and the second eccentric shaft portion of the secondary shaft of the saber saw in accordance with the first embodiment of the present invention.
Figure 23:
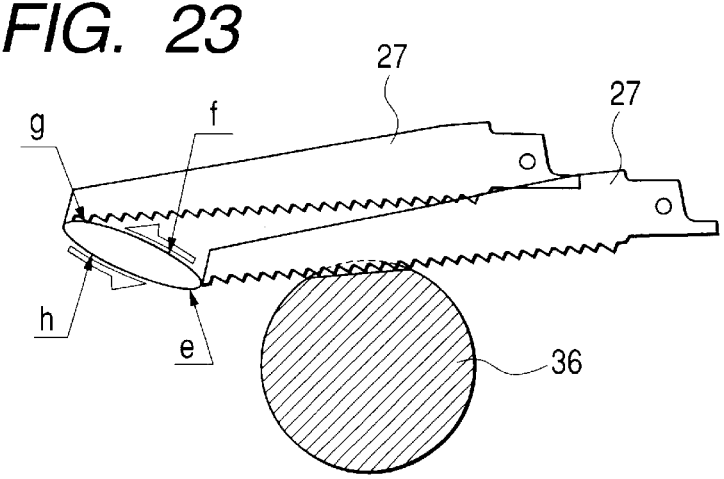
FIG. 23 is an enlarged view showing an orbital path of the saw blade of the saber saw during the orbital sawing operation shown in FIG. 21.

In FIG. 23, respective points 'e', 'f', 'g', and 'h' indicate the momentary position of saw blade 27 to give better understanding to the positional relationship between the contact plate 22 and the second eccentric shaft portion 9c of secondary shaft 9 shown in FIGS. 22(e), (f), (g), and (h). When the saw blade 27 is positioned to the point 'e' of FIG. 23, the second eccentric shaft portion 9c offsets upward (i.e., the direction of 12 o'clock) with respect to the non-eccentric portion (indicated by alternate long and two short dashes line) of the secondary shaft 9 as shown in FIG. 22(e). When the saw blade 27 is positioned to the point 'f' of FIG. 23, the second eccentric shaft portion 9c offsets leftward (i.e., the direction of 9 o'clock) with respect to the non-eccentric portion of the secondary shaft 9 as shown in FIG. 22(f). When the saw blade 27 is positioned to the point 'g' of FIG. 23, the second eccentric shaft portion 9c offsets downward (i.e., the direction of 6 o'clock) with respect to the non-eccentric portion of the secondary shaft 9 as shown in FIG. 22(g). When the saw blade 27 is positioned to the point 'h' of FIG. 23, the second eccentric shaft portion 9c offsets rightward (i.e., the direction of 3 o'clock) with respect to the non-eccentric portion of the secondary shaft 9 as shown in FIG. 22(h).

As explained above, according to the above-described first embodiment of the present invention, two different eccentric shaft portions 9b and 9c are provided on the secondary shaft 9. The contact plate 22 having two different contact portions 22a and 22b is fixed to the guide sleeve 13. With this arrangement, the plunger 20 causes reciprocative movement in the axial direction as well as causes swing movement in the up-and-down direction. Thus, the saw blade 27 causes a mixed (i.e., reciprocative and swing) movement along an elliptic path defined by the phase difference between two eccentric shaft portions 9b and 9c of the secondary shaft 9. The first embodiment of the present invention enables a user to perform the orbital sawing operation properly regardless of the direction (i.e., normal or upside-down) of saw blade 27 attached to the saber saw body.

Second Embodiment

Figures 24A, 24B:
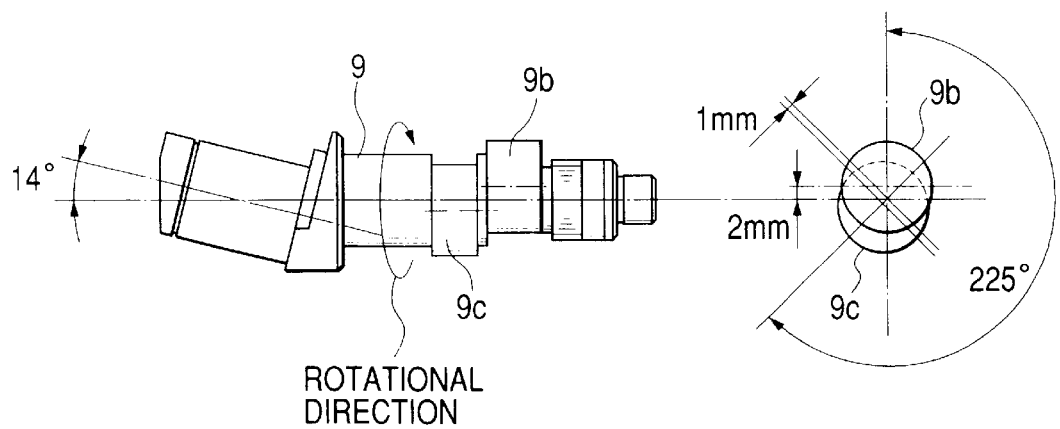
FIG. 24A is a side view showing a secondary shaft of a saber saw in accordance with a second embodiment of the present invention.
FIG. 24B is a front view showing an offset relationship between first and second eccentric shaft portions of the secondary shaft of the saber saw in accordance with the second embodiment of the present invention.

FIGS. 24A and 24B show a secondary shaft 9 in accordance with a second embodiment of the present invention. The secondary shaft 9 has a first eccentric shaft portion 9b whose eccentric amount is 2 mm with respect to the axis of secondary shaft 9. The first eccentric shaft portion 9b has a phase difference of 0° with respect to the slant shaft portion 9a. Furthermore, the secondary shaft 9 has a second eccentric shaft portion 9c whose eccentric amount is 1 mm with respect to the axis of secondary shaft 9. The second eccentric shaft portion 9c has a phase difference of 225° with respect to the first eccentric shaft portion 9b.

Figure 25:
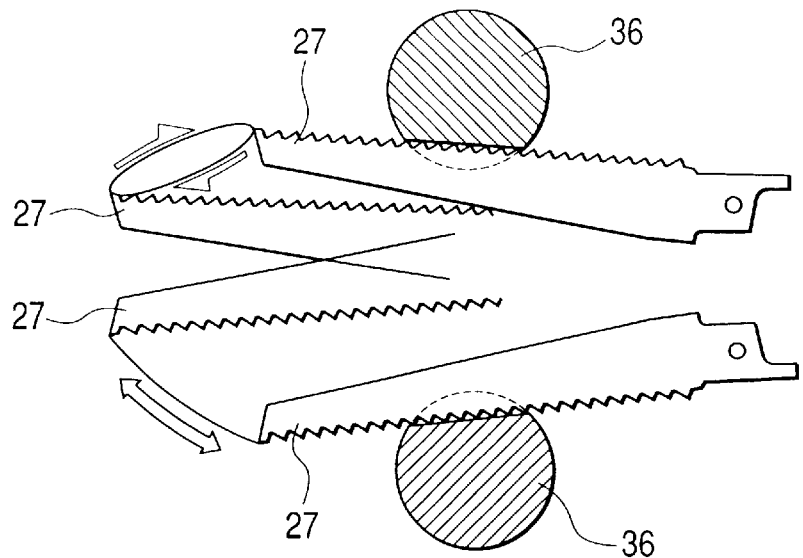
FIG. 25 is an enlarged view showing orbital paths of the saw blade of the saber saw in accordance with the second embodiment of the present invention.

FIG. 25 shows orbital paths of the saw blade 27 realized by the arrangement of the secondary shaft 9 in accordance with the second embodiment of the present invention. The orbital paths can be differentiated depending on the direction of the saw blade 27 attached to the saber saw body. As apparent from the comparison between the orbital paths shown in FIG. 16 and the orbital paths shown in FIG. 25, it becomes possible to variously change the orbital paths of the saber saw by adequately adjusting the eccentric amounts and the phase differences of the first and second eccentric shaft portions 9b and 9c of the secondary shaft 9. Thus, the present invention realizes an orbital sawing operation applicable to various materials to be cut.

Third Embodiment

FIGS. 26 and 27A–27C show a saber saw in accordance with a third embodiment of the present invention which employs a crank-type reciprocating mechanism.

Figure 26:
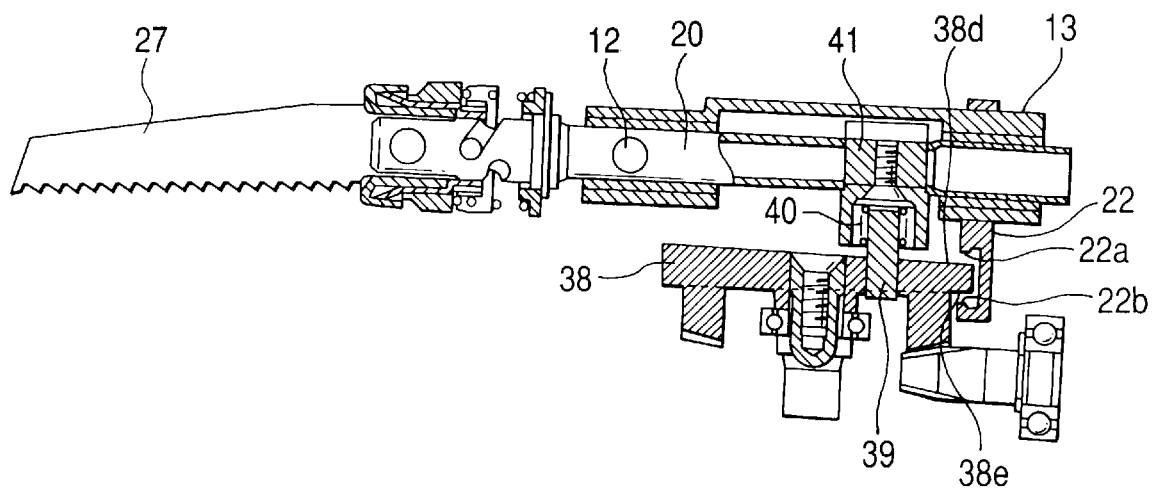
FIG. 26 is a partly cross-sectional view showing a saber saw in accordance with a third embodiment of the present invention.
Figure 27A:
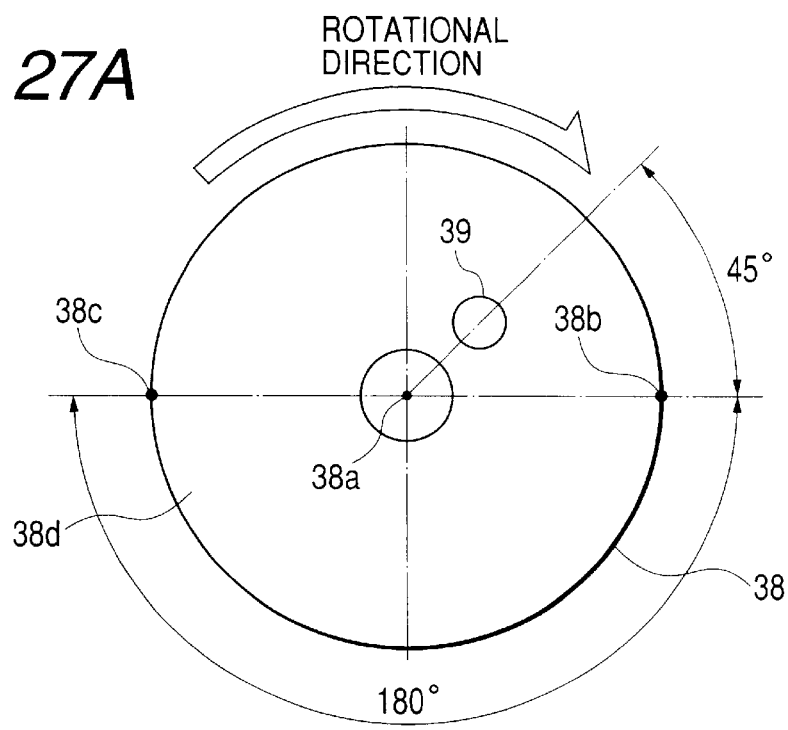
FIG. 27A is a top view showing a bevel gear with a phase relationship between the bevel gear and a pin employed in the saber saw in accordance with the third embodiment of the present invention.
Figure 27B:
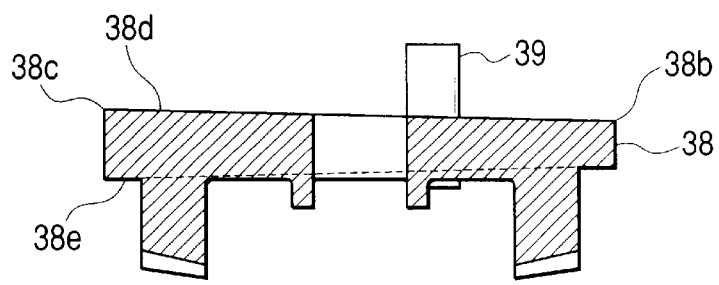
FIG. 27B is a side view showing the bevel gear in accordance with the third embodiment of the present invention.
Figure 27C:
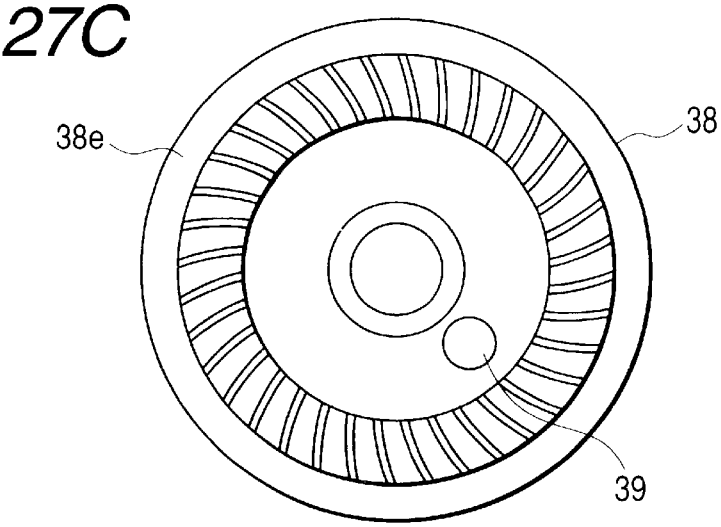
FIG. 27C is a bottom view showing the bevel gear in accordance with the third embodiment of the present invention.

As illustrated in FIG. 26, a pin 39 is attached to a bevel gear 38. The pin 39 is mechanically linked to the plunger 20 via a needle roller 40 and a connector 41. The bevel gear 38 rotates about its center 38a in a direction of an arrow. The pin 39 rotates about the center 38a of the bevel gear 38. The plunger 20 reciprocates in the guide sleeve 13 which swings about the pivot (i.e., the common axis of axle bolts 12). The contact plate 22 is fixed to the guide sleeve 13. The contact plate 22 has first and second contact portions 22a and 22b which are selectively brought into contact with the bevel gear 38. The first contact portion 22a is opposed to the second contact portion 22b in the longitudinal direction (i.e., in the up-and-down direction) of the contact plate 22.

The bevel gear 38 has a first slant surface 38d with a lowermost point 38b having a phase difference of 45° with respect to the pin 39 and an uppermost point 38c having a phase difference of 180° with respect to the lowermost point 38b. In other words, the lowermost point 38b is an axially most retracted point of the first slant surface 38d when seen in the axial direction of bevel gear 38. The uppermost point 38c is an axially most protruded point of the first slant surface 38d when seen in the axial direction of bevel gear 38. A second slant surface 38e, which is symmetrical to the first slant surface 38d in the axial direction, is formed on an opposite surface (i.e., on a reverse surface) of the bevel gear 38.

When the saw blade 27 is normally attached to the plunger 20 as shown in FIG. 26, a user applies a downward pressing force to the saw blade 27 via the saber saw body during sawing operation. The plunger 20 supporting the saw blade 27 receives an upward reaction force from a material to be cut and swings clockwise about the common axis of the axle bolts 12. The swing movement of the plunger 20 is transferred to the guide sleeve 13. The guide sleeve 13 lowers its rear end downward. The first contact portion 22a of contact plate 22 is brought into contact with the first slant surface 38d of bevel gear 38 while the second contact portion 22b of contact plate 22 is released from the second slant surface 38e of bevel gear 38. Thus, the first slant surface 38d of bevel gear 38 guides the sleeve 13 to cause a swing motion. The guide sleeve 13 (together with the plunger 20) swings about the common axis of the axle bolts 12 in a predetermined angular range, while the plunger 20 reciprocates in the axial direction. As a result, the plunger 20 and the saw blade 27 perform orbital reciprocation.

On the other hand, when the saw blade 27 is inversely attached to the plunger 20, the plunger 20 swings counterclockwise about the common axis of the axle bolts 12. The swing movement of the plunger 20 is transferred to the guide sleeve 13. The guide sleeve 13 raises its rear end upward. The second contact portion 22b of contact plate 22 is brought into contact with the second slant surface 38e of bevel gear 38 while the first contact portion 22a of contact plate 22 is released from the first slant surface 38d of bevel gear 38. Thus, the second slant surface 38e of bevel gear 38 guides the sleeve 13 to cause a swing motion. The guide sleeve 13 (together with the plunger 20) swings about the common axis of the axle bolts 12 in a predetermined angular range, while the plunger 20 reciprocates in the axial direction. As a result, the plunger 20 and the saw blade 27 perform orbital reciprocation.

In this manner, the third embodiment of the present invention enables a user to perform the orbital sawing operation properly regardless of the direction (i.e., normal or upside-down) of saw blade 27 attached to the saber saw body.

Although the first and second contact portions 22a and 22b are formed on the same contact plate 22 in the above-described embodiments, it is possible to provide independent or separate contact plates for providing the first and second contact portions 22a and 22b.

Furthermore, the orbital path of the saber saw can be arbitrarily changed by modifying the diameters of the first and second eccentric shaft portions 9b and 9c of secondary shaft 9. Furthermore, the orbital path of the saber saw can be arbitrarily changed by modifying the shapes of the first and second eccentric shaft portions 9b and 9c of secondary shaft 9 into elliptic or any other shapes.

As described above, the present invention enables a user to perform the orbital sawing operation properly regardless of the direction of saw blade 27 attached to the saber saw body. The efficiency of cutting work can be improved.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A saber saw comprising:
    a housing for accommodating a motor;
    a driven shaft rotatably supported by said housing and rotated by said motor;
    a plunger causing reciprocative motion with respect to said housing and having a front end to which a saw blade is attached;
    a first motion converting mechanism interposed between said driven shaft and said plunger for converting rotational motion of said driven shaft into the reciprocative motion of said plunger; and
    a second motion converting mechanism interposed between said driven shaft and said plunger for converting the rotational motion of said driven shaft into swing motion of said plunger,
    wherein
        a plurality of eccentric shaft portions are formed on said driven shaft; and
        said second motion converting mechanism includes contact portions selectively brought into contact with said eccentric shaft portions of said driven shaft.

2. The saber saw in accordance with claim 1, wherein said plurality of eccentric shaft portions are first and second eccentric shaft portions formed on said driven shaft.

3. The saber saw in accordance with claim 2, wherein a predetermined phase difference is provided between said first and second eccentric shaft portions of said driven shaft.

4. The saber saw in accordance with claim 3, wherein said phase difference between said first and second eccentric shaft portions is 180°.

5. The saber saw in accordance with claim 3, wherein said phase difference between said first and second eccentric shaft portions is 225°.

6. The saber saw in accordance with claim 2, wherein said first and second eccentric shaft portions are offset from each other in an axial direction of said driven shaft.

7. The saber saw in accordance with claim 2, wherein an eccentric amount of said first eccentric shaft portion is identical to an eccentric amount of said second eccentric shaft portion.

8. The saber saw in accordance with claim 2, wherein an eccentric amount of said first eccentric shaft portion is different from an eccentric amount of said second eccentric shaft portion.

9. The saber saw in accordance with claim 1, wherein said contact portions of said second motion converting mechanism are first and second contact portions selectively brought into contact with first and second eccentric shaft portions formed on said driven shaft.

10. The saber saw in accordance with claim 9, wherein said first and second contact portions are offset from each other in an axial direction of said driven shaft.

11. The saber saw in accordance with claim 10, wherein said first contact portion is opposed to said first eccentric shaft portion and said second contact portion is opposed to said second eccentric shaft portion.

12. The saber saw in accordance with claim 1, wherein said second motion converting mechanism includes a locking mechanism for restricting the swing motion of said plunger.

13. The saber saw in accordance with claim 12, wherein said first and second contact portions are released from said first and second eccentric shaft portions when said locking mechanism locks said plunger, thereby keeping said second motion converting mechanism in a neutral condition.

14. A saber saw comprising:
    a housing for accommodating a motor;
    a driven shaft rotatably supported by said housing and rotated by said motor;
    a plunger causing reciprocative motion with respect to said housing and having a front end to which a saw blade is attached;
    a guide sleeve slidably holding said plunger so as to allow said reciprocative motion and being hingedly supported about a pivot fixed to said housing so that said guide sleeve can swing in a direction normal to a reciprocating direction of said plunger;
    a first motion converting mechanism interposed between said driven shaft and said plunger for converting rotational motion of said driven shaft into the reciprocative motion of said plunger; and
    a second motion converting mechanism interposed between said driven shaft and said plunger for converting the rotational motion of said driven shaft into swing motion of said plunger,
    wherein
        first and second eccentric shaft portions are formed on said driven shaft; and
        said second motion converting mechanism includes a guide member attached to said guide sleeve, said guide member having first and second contact portions selectively brought into contact with said first and second eccentric shaft portions of said driven shaft.

15. The saber saw in accordance with claim 14, wherein a predetermined phase difference is provided between said first and second eccentric shaft portions of said driven shaft.

16. The saber saw in accordance with claim 15, wherein said phase difference between said first and second eccentric shaft portions is 180°.

17. The saber saw in accordance with claim 15, wherein said phase difference between said first and second eccentric shaft portions is 225°.

18. The saber saw in accordance with claim 14, wherein said first and second eccentric shaft portions are offset from each other in an axial direction of said driven shaft.

19. The saber saw in accordance with claim 14, wherein an eccentric amount of said first eccentric shaft portion is identical to an eccentric amount of said second eccentric shaft portion.

20. The saber saw in accordance with claim 14, wherein an eccentric amount of said first eccentric shaft portion is different from an eccentric amount of said second eccentric shaft portion.

21. The saber saw in accordance with claim 14, wherein said first and second contact portions of said guide member are offset from each other in an axial direction of said driven shaft.

22. The saber saw in accordance with claim 21, wherein said first contact portion is opposed to said first eccentric shaft portion and said second contact portion is opposed to said second eccentric shaft portion.

23. The saber saw in accordance with claim 14, wherein said second motion converting mechanism includes a locking mechanism for restricting the swing motion of said plunger.

24. The saber saw in accordance with claim 23, wherein said first and second contact portions of said guide member are released from said first and second eccentric shaft portions of said driven shaft when said locking mechanism locks said plunger, thereby keeping said second motion converting mechanism in a neutral condition.

25. The saber saw in accordance with claim 14, wherein said second motion converting mechanism includes independent or separate guide members for said first and second contact portions.

26. The saber saw in accordance with claim 14, wherein said guide member of said second motion converting mechanism is a contact plate extending in a cantilever fashion from said guide sleeve toward said driven shaft.

27. The saber saw in accordance with claim 26, wherein said contact plate has a projecting portion and a rectangular ring portion formed at a distal end thereof.

28. The saber saw in accordance with claim 27, wherein said driven shaft extends through an opening of said rectangular ring portion of said contact plate.

29. The saber saw in accordance with claim 27, wherein said first contact portion is formed at a distal end surface of said projecting portion.

30. The saber saw in accordance with claim 27, wherein said second contact portion is formed at an inner surface of said rectangular ring portion.

31. A saber saw comprising:

a housing for accommodating a motor;

a bevel gear rotatably supported by said housing and rotated by said motor;

a plunger causing reciprocative motion with respect to said housing and having a front end to which a saw blade is attached;

a guide sleeve slidably holding said plunger so as to allow said reciprocative motion and being hingedly supported about a pivot fixed to said housing so that said guide sleeve can swing in a direction normal to a reciprocating direction of said plunger;

a first motion converting mechanism interposed between said bevel gear and said plunger for converting rotational motion of said bevel gear into the reciprocative motion of said plunger; and a second motion converting mechanism interposed between said bevel gear and said plunger for converting the rotational motion of said bevel gear into swing motion of said plunger, wherein first and second slant surfaces are formed on said bevel gear; and said second motion converting mechanism includes a guide member attached to said guide sleeve, said guide member having first and second contact portions selectively brought into contact with said first and second slant surfaces of said bevel gear.

32. The saber saw in accordance with claim 31, wherein said guide member of said second motion converting mechanism is a contact plate extending in a cantilever fashion from said guide sleeve toward said bevel gear.

33. The saber saw in accordance with claim 32, wherein said contact plate has the first contact portion opposed to said first slant surface of said bevel gear and the second contact portion opposed to said second slant surface of said bevel gear.

* * * * *